July 18, 1967 C. V. TONER 3,331,444
FAIRING ASSEMBLY
Filed Dec. 28, 1966 4 Sheets-Sheet 1
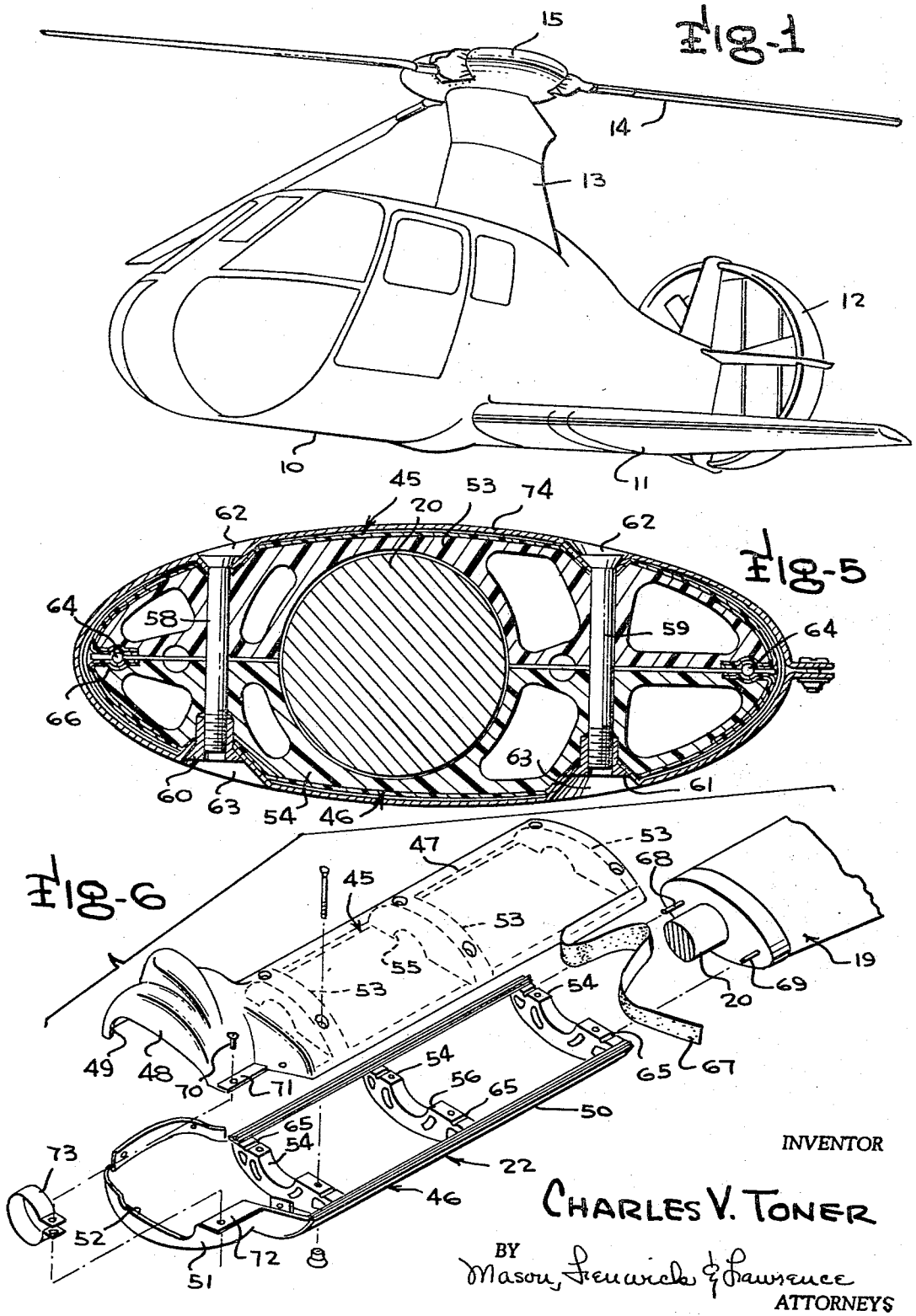
INVENTOR
CHARLES V. TONER
BY Mason, Fenwick & Lawrence
ATTORNEYS

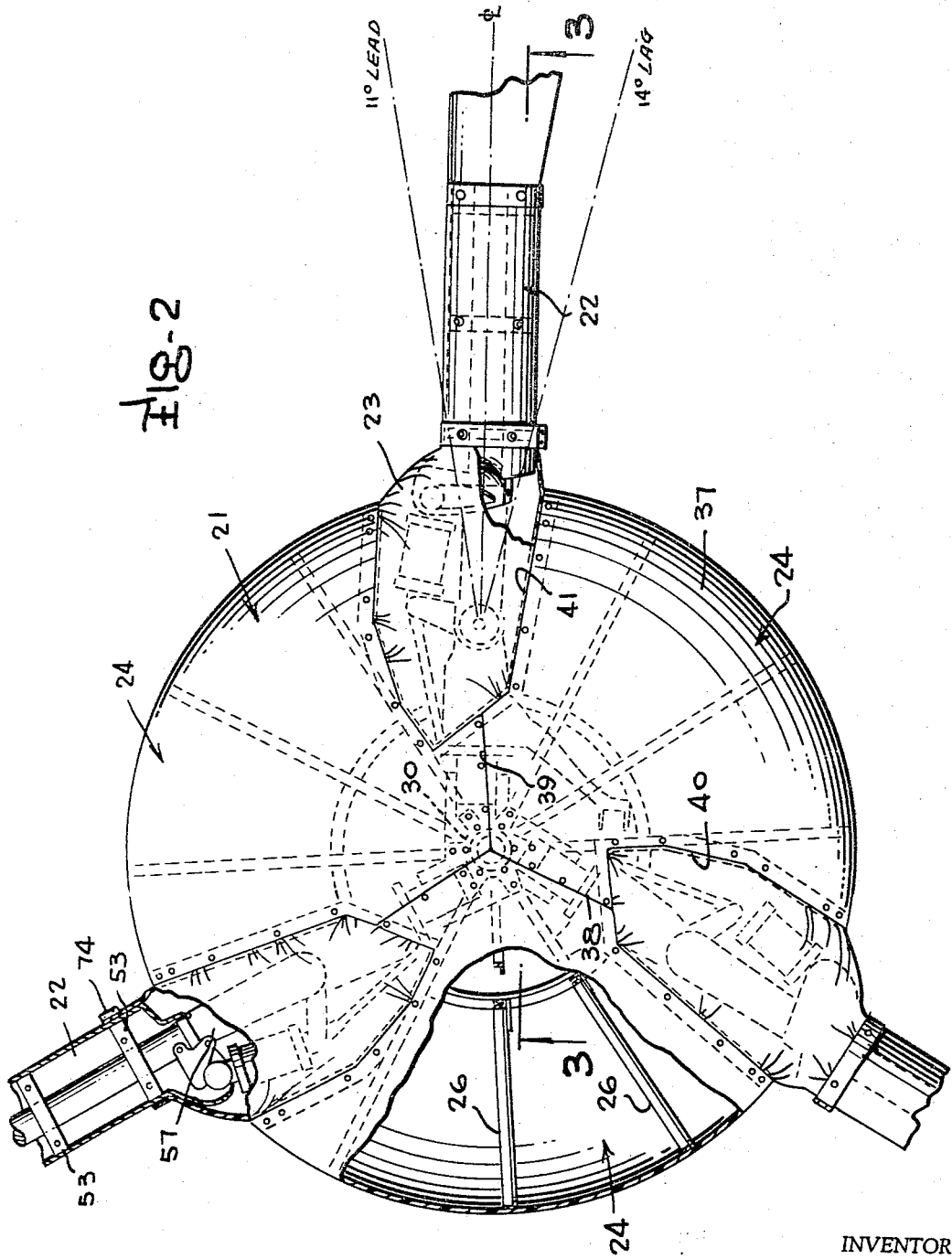

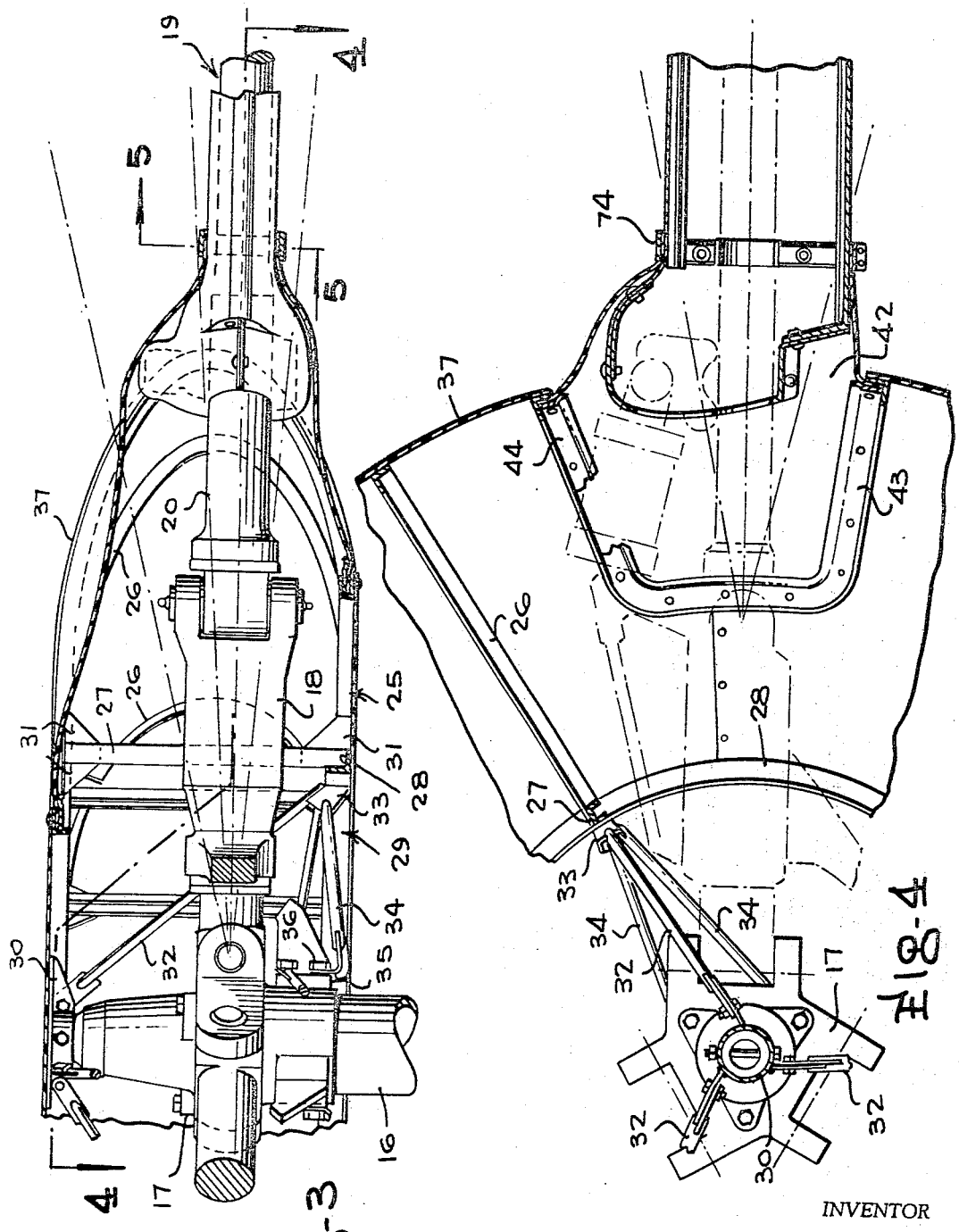

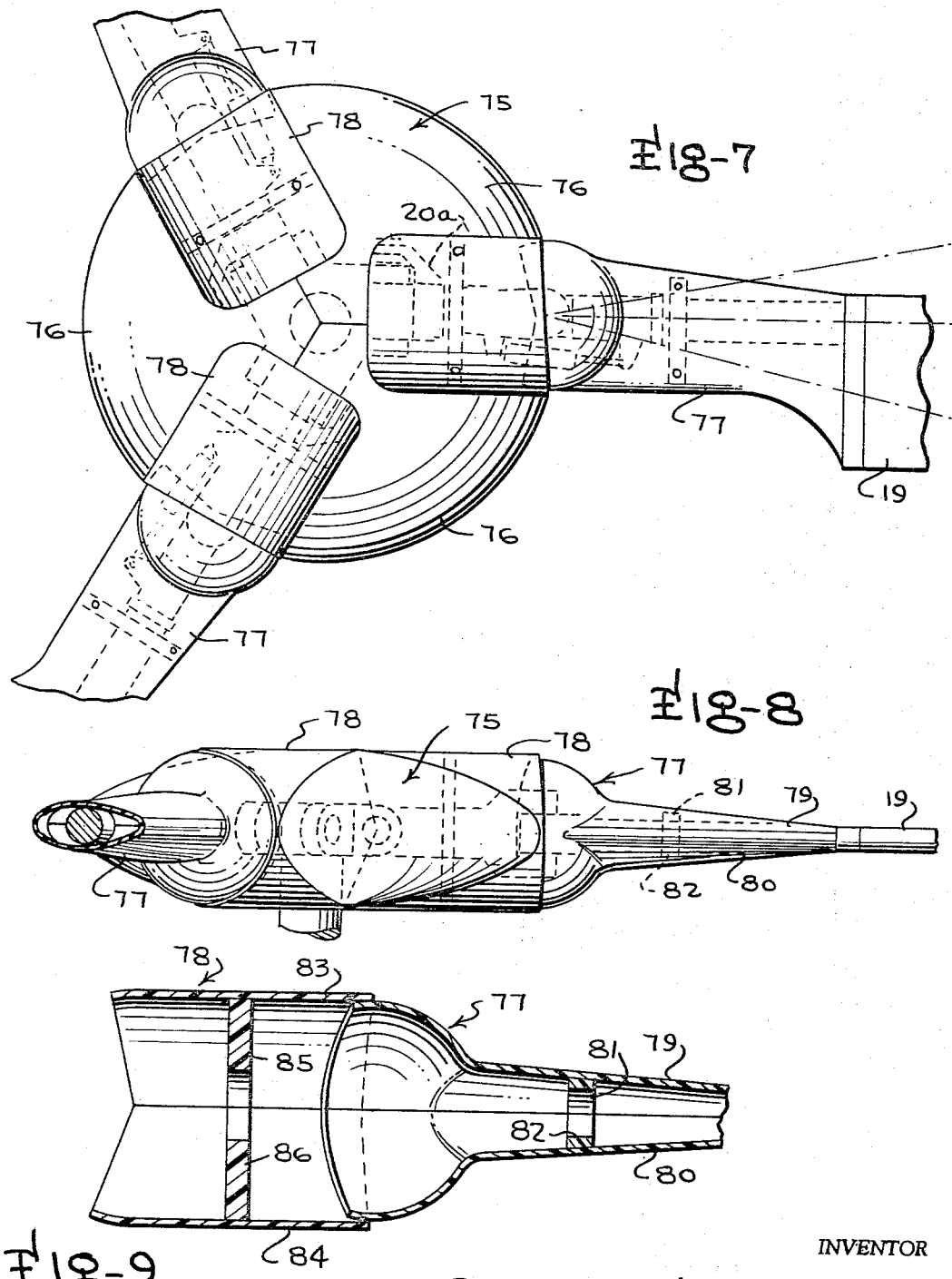

United States Patent Office 3,331,444
Patented July 18, 1967

3,331,444
FAIRING ASSEMBLY
Charles V. Toner, Wallingford, Pa., assignor to Piasecki Aircraft Corporation, Philadelphia, Pa., a corporation of Pennsylvania
Filed Dec. 28, 1966, Ser. No. 605,312
10 Claims. (Cl. 170—159)

This application is a continuation-in-part of my co-pending application, Ser. No. 500,649, filed Oct. 22, 1965, now abandoned. This invention relates to a fairing assembly and more particularly to a fairing assembly for an overhead rotor blade assembly of a rotary wing aircraft.

In rotary wing aircraft, commonly referred to as helicopters, there generally is provided a rotor mast having a plurality of outwardly extending rotor blades operatively connected to the rotor mast for rotational movement therewith and for universal movement relative thereto. Such an assembly also is provided normally with control mechanisms mounted adjacent the rotor mast and operatively connected to the rotor blades for cyclic and collective pitch control.

In conventional rotary wing aircraft, the overhead rotor blade assembly and associated control mechanisms usually are left exposed. Such exposure has been found to be detrimental, in that it accelerates the wear of the component parts, often resulting in malfunctioning of the assembly and an increase in the maintenance required. In addition, the exposed assembly being irregular in general configuration, has a detrimental effect on the flight characteristics of the aircraft.

Accordingly, it is the general object of this invention to provide a novel fairing assembly.

Another object of this invention is to provide a novel fairing assembly for rotary wing aircraft.

A further object of this invention is to provide a fairing assembly for the overhead rotor blade assembly and associated control mechanisms of a rotary wing aircraft.

A still further object of this invention is to provide a fairing assembly for an overhead rotor blade assembly of a rotary wing aircraft which will enclose the assembly and prevent exposure of the component parts thereof to the elements.

Another object of this invention is to provide a novel fairing assembly for the overhead rotor blade assembly of a rotary wing aircraft, which will improve the flight characteristics of the aircraft.

A further object of this invention is to provide a fairing assembly for the overhead rotor blade assembly of a rotary wing aircraft, which will permit relative movement between the rotor blades and the rotor mast to which the rotor blades are operatively connected.

A still further object of the present invention is to provide a novel fairing assembly for the overhead rotor blade assembly of a rotary aircraft, which will readily permit cyclic and collective pitch control of the rotor blades.

Another object of this invention is to provide a novel fairing assembly for the overhead rotor blade assembly of a rotary wing aircraft, which is easy to assemble and disassemble.

A further object of this invention is to provide a novel fairing assembly for the overhead rotor blade assembly of a rotary wing aircraft, which is simple in construction and comparatively inexpensive to manufacture.

Other objects and advantages of the present invention will become more apparent to those persons skilled in the art, from the following description when taken in conjunction wtih the accompanying drawings, wherein:

FIGURE 1 illustrates a perspective view of a rotary wing aircraft incorporating a first embodiment of the invention;

FIGURE 2 is an enlarged top plan view of the first embodiment of the invention, having portions thereof broken away;

FIGURE 3 is a cross-sectional view taken along line 3—3 in FIGURE 2;

FIGURE 4 is a cross-sectional view taken along line 4—4 in FIGURE 3, having portions thereof broken away;

FIGURE 5 is an enlarged cross-sectional view taken line 5—5 in FIGURE 3;

FIGURE 6 is a perspective view of a component of the first embodiment illustrated in exploded relation;

FIGURE 7 is a top plan view of a second embodiment of the invention, having portions thereof broken away;

FIGURE 8 is a side elevational view of the second embodiment; and

FIGURE 9 is an enlarged cross-sectional view taken along line 9—9 in FIGURE 7.

Briefly described, the present invention relates to a fairing assembly for an overhead rotor blade assembly of a rotary wing aircraft, including a rotor mast and a plurality of outwardly extending rotor blades operatively connected to the rotor mast, generally comprising segmented housing means, including a plurality of cover segments disposed between successive rotor blades interconnected to form an integral unit, cover means mounted on the rotor blades extending into the housing means, and means for securing the housing means to the rotor mast.

According to a more specific embodiment of the invention, there is provided such a fairing assembly generally comprising segmented housing means, including a plurality of rigid cover segments disposed between successive rotor blades and interconnected to form an integral unit, the connecting shaft or shank portion of each rotor blade having rigid cover means, a plurality of flexible cover means each interconnecting the housing means and a shank cover means to enclose the opening therebetween and permit movement of the rotary blade relative to the rotor mast and means for securing the housing means to the rotor mast. In addition, according to another embodiment of the invention, there is provided a fairing assembly for an overhead rotor blade assembly including a rotor mast, a plurality of outwardly extending linking members operatively interconnected to the rotor mast for pivotal movement in a vertical plane, and a plurality of rotor blades having shaft or shank portions operatively connected to the free end of the linking members for pivotal movement in planes substantially normal to the planes of movement of the linking members, generally comprising segmented housing means consisting of a plurality of rigid cover segments disposed between successive rotor blades interconnected to form an integral rigid unit, rigid cover means mounted on the connecting shank portion of each rotor blade, rigid cover means mounted on each linking member extending between the housing means and the shank cover means to enclose the opening therebetween and permit movement of the rotor blade relative to the rotor mast and means for securing the housing means to the rotor mast.

Referring to FIGURES 1 through 6, there is illustrated a first embodiment of the invention. FIGURE 1 illustrates a rotary wing aircraft incorporating the first embodiment of the invention. The aircraft generally includes a fuselage 10, wings 11, a tail propeller assembly 12, a mast shroud assembly 13, an overhead rotor blade assembly 14, and a fairing assembly 15 for the overhead rotor blade assembly. Referring specifically to FIGURES 2 and 3, the overhead rotor blade assembly 14 includes a rotor mast 16, a rotor mast hub 17 mounted on the upper end of the rotor mast, a plurality of outwardly extending linking members 18 pivotally connected to the rotor blade hub for pivotal movement substantially in a vertical plane, and a plurality of rotor blades 19, each having a shaft or shank portion 20 pivotally connected to a linking member 18 for pivotal movement relative thereto in a plane substantially normal to the plane of movement of the linking member relative to the rotor blade hub. It will be appreciated that the aforementioned operative connection permits universal movement of the blades relative to the rotor mast. This freedom of movement permits cyclic and collective pitch control of the rotor blades by suitable control mechanisms associated with the rotor blade assembly and operatively connected to the rotor blades.

FIGURES 2 through 4 best illustrate the first embodiment which generally consists of a segmented housing unit 21, a plurality of segmented shank cover units 22, and a plurality of boot members 23 interconnecting the segmented housing unit and the shank cover units. The housing unit 21 comprises a plurality of cover segments 24 which are adapted to be positioned between successive rotor blades and interconnected to form an integral unit having a continuous smooth external surface and a substantially elliptical vertical cross-sectional configuration, when the segments are assembled.

As best illustrated in FIGURES 3 and 4, each segment 24 has a frame assembly 25, including a plurality of circumferentially spaced, arcuate or U-shaped frame members 26, a plurality of vertical frame members 27 interconnecting the upper and lower portions of the U-shaped members 26, and an arcuate frame member 28 interconnecting the lower ends of the vertical frame members 27. The lower leg portions of the frame members 26 terminate considerably short of the upper leg portions thereof to provide an opening 29 in the bottom of the housing unit 21 when the segments are assembled. The upper leg portions of the frame members 26 are adapted to be secured to a mounting plate 30 mounted on the upper end of the rotor mast. The connection of the vertical frame members 27 with the frame members 26 is reinforced by means of a plurality of gusset plates 31. In addition, the mounting of the frame assembly 25 on the rotor mast is reinforced by means of a plurality of upper brace members 32 interconnecting the mounting plate 30 and a flange 33 mounted on the horizontal arcuate frame member 28 and a plurality of lower brace members 34, each secured to the flange member 33 and attachable to a lug 35 mounted on the rotor mast below the hub 17, by means of suitable bolts 36.

The arcuate frame members 26 of a segment 24 are provided with a cover 37 which terminates at its upper end at an inclined angle slightly in excess of 120°, to permit the upper ends of the segments to overlap and be interconnected, as best illustrated in FIGURE 2. In addition, the adjoining and overlapping upper portions of the segments are adapted to be secured to the mounting plate 30 by suitable fastening means. The side edges 38 and 39 of the cover members 37 are recessed or cut out, as at 40 and 41, to provide openings 42 when the segments are assembled to form the housing unit 21, which receive the shank or shaft portions 20 of the rotor blades therethrough. The cut-out portions 40 and 41 are provided with frame members 43 and 44 along the edges thereof, to provide a reinforcing strip along the periphery of the opening 42.

Referring to FIGURES 5 and 6 of the drawings, there is illustrated in greater detail, the construction of the cover unit for the shank portion of the rotor blade. Each shank cover unit 21 consists of an upper cover segment 45 and a lower cover segment 46. The upper cover segment 45 has an elongated section 47 and an offset section 48 having an opening 49 in the end thereof. Similarly, the lower cover segment 46 has an elongated section 50 similar to the elongated section 47 and an offset section 51, having an opening 52 in the end thereof. The upper and lower segments 45 and 46 are adapted to be joined, as illustrated in FIGURE 5, to provide an elongated portion having a substantially elliptical cross-sectional configuration with the offset section joining to provide an opening in the inner end of the unit. Each of the upper elongated sections 47 is provided with a plurality of longitudinally spaced rib members 53 which are adapted to register with a similar set of longitudinally spaced ribs 54 provided in a complementary lower elongated section 50. The upper rib members 53 are provided with recesses 55 registerable with corresponding recesses 56 in the lower rib members 54 which provide longitudinally aligned circular openings for receiving the shank or shaft portion 20 of the rotor blade. The upper and lower rib members 53 and 54 are seated on the shank portion 20 of the rotor blade, as illustrated in FIGURE 5, and are secured rigidly thereto by means of bolt members 58 and 59 extending through aligned openings in the rib members and being threadably received in threaded inserts 60 and 61 in the lower rib members 54. The upper and lower ends of the openings in the upper and lower rib members are countersunk, as at 62 and 63, to receive the beveled head portions of the bolts below the exterior surface of the elongated section 47 and the beveled flange portions of the threaded inserts, within the exterior surface of the lower elongated section 50. The upper rib members 53 also are provided with longitudinally disposed grooves 64 adapted to register with similar grooves 65 in the lower rib members 54 for receiving a rubber seal 66. The interior of the shank cover units also are sealed by means of a tape 67, which is provided along the adjoining longitudinal edges of the upper and lower cover segments.

The shank cover unit is mounted on the shank portion of the rotor blade by mounting the segments 45 and 46 on the shank member 20 and securing the segments together by means of the bolts 58 and 59. The unit 22 is maintained in proper alignment with the rotor blade 19 by means of longitudinally disposed aligning pins 68 and 69, which are received in suitable openings in the rib members 53 and 54 disposed on the outer ends of the unit. The offset portions 49 and 51 further are secured together by means of a bolt and nut assembly 70, which fastens together a pair of laterally extending flanges 71 and 72. The offset portions also are secured to the shank fitting 57 by means of a clamp member 73 which is provided with a pair of laterally extending flanges received between the flanges 71 and 72 of the offset portions, and held together by means of the bolt and nut assembly 70.

When the housing unit 21 and the shank cover unit 22 are assembled, as shown in FIGURE 2, the openings 42 in the housing member are closed by means of a plurality of boot members 23 consisting of a flexible material. The outer end of each boot is adapted to be mounted on the elongated sections of a shank cover unit and rigidly secured thereto by means of a clamp 74. Similarly, the inner end of the boot member is secured along the periphery of the opening 42 and is fastened to the reinforcing members 43 and 44. Each of the boot members 23 completely encloses the opening between the housing unit 21 and the shank cover unit 22.

In assembling the fairing assembly on the overhead rotor blade assembly, the housing segments 24 first are assembled on the rotor mast between the rotor blades. The overlapping upper portions thereof are secured together and to the mounting plate 30, by means of suitable fasteners. In addition, the upper and lower brace members 32 and 34 are secured to the mounting plate 30 and the lower mounting lugs 35, respectively. The shank cover units 22 then are assembled on the shank members 20 by mounting the cover segments 45 and 46 on the shank members and securing them together by means of the bolts 58 and 59. The offset portions 48 and 51 are secured together by means of the bolt and nut assemblies 70, and secured to the shank member 20 by means of the clamp 73. The shank cover members are adjusted in proper alignment with the rotor blades by means of the aligning pins 68 and 69. The boot members then are installed in the openings provided between the housing unit 21 and the shank cover units 22. The inner end of each boot is fastened onto the reinforcing members 43 and 44 by suitable fasteners, and the outer end thereof is secured on the shank cover member by means of the clamp 74. To disassemble the fairing assembly, the aforementioned procedure substantially is reversed. It will be seen that the assembly can easily be assembled and disassembled.

The cover portions of the housing segments 24 and the cover portions of the shank cover units 22 can be constructed of any suitable rigid lightweight material, although it is preferred that it be constructed of a material such as fiber glass. The frame structure of the housing unit 21 also can be constructed of any rigid lightweight material having suitable strength characteristics such as aluminum and the like. Furthermore, the boots 23 may be constructed of any suitable flexible material such as neoprene and the like.

Referring to FIGURES 7 through 9 of the drawings, there is illustrated a second embodiment of the invention. Similarly to the first embodiment, the second embodiment includes an assembly having a segmented housing unit 75 consisting of a plurality of rigid segments 76, substantially similar to the segments 24, a plurality of rigid shank cover units 77 similar to the shank cover units 22, and a plurality of rigid intermediate cover units 78. The rigid housing segments 76 are provided with recessed or cut-out edges defining openings when the segments are assembled, through which the linking members and shank portions of the rotor blades extend. Each of the shank cover units 77 includes an upper elongated section 79 and a lower elongated section 80, provided with aligned rib members 81 and 82, which are mounted on the shank portion of the rotor blade and secured thereto by means of suitable bolts. The intermediate cover units 78 comprise upper and lower elongated rigid sections 83 and 84, which are semicircular in cross-sectional configuration. The elongated sections 83 and 84 are mounted on the linking member by means of upper and lower rib members 85 and 86, having registering arcuate recesses which engage the linking member. The rib members 85 and 86 are secured to the linking member outboard of the pitch horn 20a. As best seen in FIGURE 9, the inner end of each shank cover unit 77 is received within the outer end of an intermediate cover unit 78. The interrelationship of the cover units and the mounting thereof are adapted to permit adjustment of the rotor blades in lead-lag, flapping and pitch control.

The housing unit 75 preferably has a continuous smooth exterior surface and is substantially elliptical in vertical cross-section. The intermediate cover units 78 have a substantially circular vertical cross-sectional configuration which substantially merge at their inner ends with the exterior surface of the housing unit 76. In addition, the inner ends of the shank cover units 77 have substantially the same cross-sectional configuration as the intermediate cover units 78 and substantially merge therewith to provide a smooth continuous exterior surface. Extending outwardly from the intermediate cover units, the shank cover units decrease abruptly and then gradually in cross-sectional configuration, so that the exterior surfaces of the outer ends thereof merge with the exterior surfaces of the associated rotor blades.

In the embodiment shown in FIGURES 7, 8, and 9, the blade pitch horn is shown attached to the linking member inboard of the lead-lag hinge. Sometimes it is desirable to attach the pitch horn to the link member outboard of the lead-lag hinge. In such a case, members 83 and 84 need not be semicircular in cross-section throughout their length, but could have substantially flat, vertical sides adapted to slide relative to the openings in segments 76, since only flapping motion would occur in members 83 and 84. Both lead-lag and pitch motion would be accommodated at the spherical member 77, moving within a circular opening in the outboard end of members 83 and 84.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. A fairing assembly for an overhead rotor blade assembly of a rotary wing aircraft including a rotor mast and a plurality of outwardly extending rotor blades operatively connected to said rotor mast comprising a segmented housing assembly, said housing assembly comprising a plurality of rigid cover segments disposed between successive rotor blades interconnected to form an integral unit having a continuous smooth exterior surface and a substantially elliptical vertical cross-sectional configuration, each of said rigid cover segments including a frame assembly having a plurality of circumferentially spaced, arcuate frame sections, vertical sections interconnecting the ends of each arcuate section and horizontal arcuate sections interconnecting circumferentially spaced ends of said arcuate frame sections, and a cover member disposed on the circumferentially spaced arcuate frame sections, the adjacent ends of successive segments being recessed to provide an opening when said segments are assembled for receiving a rotary blade therethrough, the connecting shank portion of each rotor blade having rigid cover means, said shank cover means having a substantially elliptical vertical cross-sectional configuration, a plurality of flexible boot members each interconnecting said housing assembly and a shank cover member to enclose the opening therebetween and permit movement of the rotary blade relative to said mast and means for securing said housing assembly to said rotor mast.

2. A fairing assembly for an overhead rotary blade assembly of a rotary wing aircraft including a rotor mast, a plurality of outwardly extending linking members operatively interconnected to said rotor mast for pivotal movement in a plane substantially passing through the axis of said rotor mast and a plurality of rotor blades having shank portions operatively connected to the free ends of said linking members for pivotal movement in planes substantially normal to the planes of movement of said linking members comprising segmented housing means, said housing means comprising a plurality of rigid cover segments disposed between successive rotor blades interconnected to form an integral rigid unit, the connecting shank portion of each rotor blade having rigid cover means, each linking member having rigid cover means extending between said housing means and the shank cover means to enclose the opening therebetween and permit movement of the rotary blade relative to said rotor mast and means for securing said housing means to said rotor mast.

3. A fairing assembly according to claim 2, wherein said integral unit formed when said rigid cover segments are interconnected between successive rotor blades, is provided with a smooth exterior surface.

4. A fairing assembly according to claim 2, wherein said integral unit formed when said rigid cover segments are interconnected between successive rotor blades, has a substantially elliptical cross-sectional configuration.

5. A fairing assembly according to claim 2, wherein the adjacent edges of successive housing cover segments are recessed to provide openings when said segments are assembled for receiving said rotor blades with their cover means mounted thereon, therethrough.

6. A fairing assembly according to claim 2, wherein the inner edges of said blade shank cover means are received within the outer edges of said linking member cover means.

7. A fairing assembly according to claim 6, wherein said linking member cover means are cylindrical.

8. A fairing assembly for an overhead rotary blade assembly of a rotary wing aircraft including a rotor mast, a plurality of outwardly extending linking members operatively interconnected to said rotor mast for pivotal movement in a plane substantially passing through the axis of said rotor mast, and a plurality of rotor blades having shank portions operatively connected to the free ends of said linking members for pivotal movement in planes substantially normal to the planes of movement of said linking members comprising a plurality of rigid cover segments disposed between successive rotor blades interconnected to form an integral unit having a continuous smooth exterior surface and a substantially elliptical vertical cross-sectional configuration, each of said rigid cover segments including a frame assembly having a plurality of circumferentially spaced, arcuate frame sections, vertical sections interconnecting the ends of each arcuate section and horizontal arcuate sections interconnecting circumferentially spaced ends of said arcuate frame sections, and a cover member disposed on the circumferentially spaced arcuate frame sections, the adjacent ends of successive segments being recessed to provide openings when said segments are assembled for receiving linking members therethrough, the connecting shank portion of each rotor blade having rigid cover means, each linking member having rigid cover means extending into the adjacent opening in said housing assembly to permit movement of the rotary blade relative to said rotor mast and means for securing said housing assembly to said rotor mast.

9. A fairing assembly according to claim 8, wherein the inner edges of the blade shank cover means are received within the outer edges of said linking member cover means.

10. A fairing assembly according to claim 9, wherein said linking member cover means are cylindrical.

References Cited

UNITED STATES PATENTS

| | | | |
|---|---|---|---|
| 2,210,190 | 8/1940 | Stanley | 170—159 X |
| 2,498,072 | 2/1950 | Dean. | |
| 2,852,207 | 9/1958 | Jovanovich | 170—160.11 X |
| 3,217,811 | 11/1965 | Hibyan et al. | 170—159 X |

MARTIN P. SCHWADRON, *Primary Examiner.*

EVERETTE A. POWELL, JR., *Examiner.*